United States Patent
Schein

(10) Patent No.: US 6,616,033 B1
(45) Date of Patent: Sep. 9, 2003

(54) SPILL-PROOF DISPOSABLE CUP WITH INTEGRAL SEALING FLAP

(76) Inventor: Gary M. Schein, 716 N. Ventura Rd. #332, Oxnard, CA (US) 93030

(*) Notice: Subject to any disclaimer, the term of this patent is extended or adjusted under 35 U.S.C. 154(b) by 0 days.

(21) Appl. No.: 09/705,176

(22) Filed: Nov. 1, 2000

(51) Int. Cl.[7] .............................. B65D 77/28; B65D 5/72
(52) U.S. Cl. .................... 229/103.1; 229/141; 229/404; 383/84; 383/906
(58) Field of Search .............................. 229/103.1, 141, 229/404; 383/84, 104, 211, 904, 906; 426/85, 115

(56) References Cited

U.S. PATENT DOCUMENTS

| | | | |
|---|---|---|---|
| 927,826 A | * 7/1909 | Breitmeyer | 229/404 |
| 2,220,746 A | * 11/1940 | Wentz | 229/103.1 |
| 3,090,542 A | 5/1963 | Miller | |
| 3,144,979 A | * 8/1964 | Young | 229/141 |
| 3,303,985 A | * 2/1967 | Prokes et al. | 229/103.1 |
| 3,858,767 A | 1/1975 | Borin | 222/494 |
| 4,573,631 A | 3/1986 | Reeves | |
| 4,712,725 A | 12/1987 | Moore | |
| 4,785,940 A | * 11/1988 | Wilson | 383/84 |
| 4,806,021 A | * 2/1989 | Koudstaal et al. | 229/103.1 |
| 4,867,372 A | * 9/1989 | Patterson | 229/141 |
| 4,930,906 A | * 6/1990 | Hemphill | 383/104 |
| 4,988,547 A | * 1/1991 | Voto, Jr. et al. | 383/84 |
| 5,150,971 A | * 9/1992 | Strong et al. | 383/84 |
| 5,154,448 A | 10/1992 | Griffin et al. | 283/102 |
| 5,520,449 A | * 5/1996 | Klak | 383/84 |
| 5,676,306 A | 10/1997 | Lankin et al. | 229/404 |
| 5,992,892 A | 11/1999 | Schaefer et al. | 283/901 |
| 6,070,752 A | 6/2000 | Nava et al. | 220/521 |
| 6,102,568 A | * 8/2000 | Davis | 229/404 |

FOREIGN PATENT DOCUMENTS

WO    WO 93/07065 A1 * 4/1993 ................ 229/141

* cited by examiner

Primary Examiner—Gary E. Elkins
(74) Attorney, Agent, or Firm—Lyon & Harr; Mark A. Watson

(57) ABSTRACT

A disposable container according to present invention is embodied in a thin-walled container having an integral sealing flap. Such containers include cups or other vessels for holding beverages, food or other substances. The disposable container preferably has a truncated conical shape. One example of such a shape is a typical beverage cup commonly dispensed at fast food restaurants and convenience stores. However, any shape or size of disposable container may be used, so long as the container is sealed using an integral sealing flap in accordance with the present invention. Once the container has been filled, it is closed by squeezing or folding the top of the container together. The container is then sealed by folding the integral sealing flap over one side of the top of the closed container. The sealing flap is then secured using conventional adhesives, such as, for example, glue, rubber cement, or tape, that are integral to either or both the surface of the container, or the surface of the sealing flap. In addition, in one embodiment, the adhesive is reusable, so that the container may be opened, refilled, and then resealed. Further, because the volume of the container may be lessened by squeezing or folding the top of the container together, as described above, in one embodiment, a fill-line is included on either the interior or exterior surface of the container for alerting the user to a maximum volume for the sealed container. Additional embodiments include integral drinking straws and pouring spouts.

19 Claims, 6 Drawing Sheets

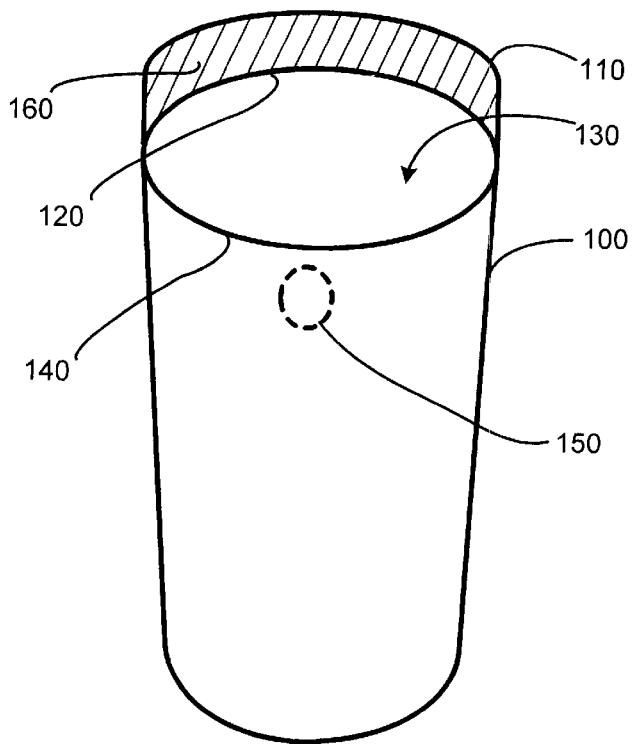
FIG. 1
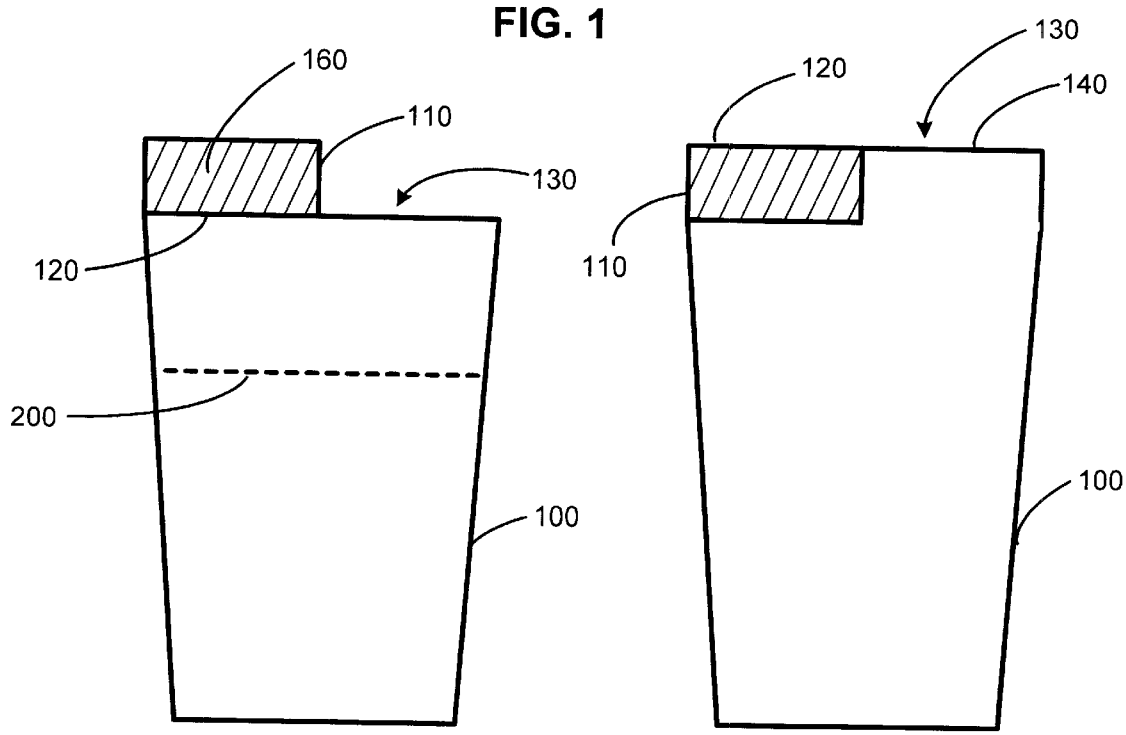
FIG. 2
FIG. 3

SPILL-PROOF DISPOSABLE CUP WITH INTEGRAL SEALING FLAP

BACKGROUND

1. Technical Field

This invention relates to disposable containers such as cups or cartons having an integral sealing flap for sealing the container to eliminate the possibility of spillage of beverages, liquids, or other substances held within the container.

2. Related Art

Disposable containers such as cups and cartons for holding beverages have been available for many years. Such containers are commonly dispensed at fast food restaurants and convenience stores for serving beverages. Typically, these containers are sealed with a plastic lid that fits over a top opening of the container so as to close the container. These lids often include holes in which straws can be placed such that a user can drink a beverage in a cup from the straw as it protrudes through the lid and into the cup. Other types of lids used to seal or cover containers include a type of hinged panel that a user can pull back or push in so as to drink from a cup while the lid is still attached. Such lids are often used with hot beverages such as coffee or tea.

Over the years, various schemes have been suggested or adopted for ensuring a tighter or more secure fit for the lids described above. However, regardless of how loose or how tight such lids fit, they are prone to accidental or inadvertent removal. For example, if a container employing a removable plastic lid is dropped, squeezed too hard, or simply tipped over, the end result is often that the lid separates from the container, with the beverage or liquid held within the container winding up either on the ground, all over an unlucky user who had been holding the cup, or all over an innocent bystander.

The problem of dropping or knocking over cups and containers is especially common with very young children. Consequently, it is uncommon to see disposable cups with plastic lids, as described above, being used in a home with young children, as the foreseeable result of such use is often a rather large wet mess. Instead, in a home having young children, hard plastic beverage cups with screw-on lids having either a drinking spout or a hole for a straw are commonly used. However, such beverage cups are not disposable. Consequently, they require more work in that they are typically washed between uses. Further, if a lid is misplaced, they cups are of little use because of the likelihood of spillage by a young child.

Still other solutions have involved complex, and thus expensive, schemes for ensuring that lids placed on containers or cups are less likely to be inadvertently removed. However, because it is more difficult for such lids to be removed, it is also more difficult to put such lids on in the first place.

Another solution that has been used for sealing disposable containers for beverages, food or other substances involves a folding gable top. Typically, the container is filled with a beverage, food or other substance, and then the top of the container is folded together in a manner similar to that of a conventional paper milk carton. A small plastic clip or the like typically holds the top of the carton together so as to seal the carton. While this solution tends to be somewhat more secure than using a disposable plastic lid, as described above, it has several drawbacks. First, such containers tend to be more expensive to manufacture than a traditional cup or container because of the numerous folds required to create a gable top. Further, the clips that hold the top closed are rather small, and in some instances can be somewhat fragile. Consequently, if the clip is misplaced or damaged, there is no way to seal the container in order to prevent spills.

Therefore, in order to overcome the limitations of current disposable containers, what is needed is a container that can be securely sealed, after being filled with beverages, food or other substances, without relying on a removable lid. Further, once the seal is engaged, it should not be subject to inadvertent opening or removal such as by dropping or squeezing the container. Finally, the container should not rely on separate devices, such as clips, to hold the container closed or sealed.

SUMMARY

The present invention involves a spill-proof disposable container, such as a cup or carton for holding beverages, food or other substances. This disposable container satisfies all of the foregoing needs. Specifically, the container is capable of being securely sealed without the need to employ removable lids, clips or other devices. Further, the seal employed by the disposable container of the present invention is not subject to inadvertent opening by either dropping or squeezing the disposable container. In addition, the disposable container can be easily and inexpensively manufactured from conventional materials such as, for example, paper, plastic, or a polymer or wax coated paper as is commonly used for disposable drinking vessels. Further, such materials are also used in one embodiment for producing an insulating embodiment of a disposable container for holding hot or cold liquids or other substances in accordance with the present invention. Finally, the disposable container of the present invention can be manufactured in any desired size to provide any desired storage volume when sealed.

A disposable container according to present invention is embodied in a thin-walled container having an integral sealing flap. Such containers include cups or other vessels for holding beverages, food or other substances. The disposable container preferably has a truncated conical shape. One example of such a shape is a typical beverage cup commonly dispensed at fast food restaurants and convenience stores. However, any shape or size of disposable container may be used, so long as the container is sealed in accordance with the present invention. For example, in one embodiment a container having a folding gable top with an integral sealing flap is used. Regardless of the shape or style of the container, once the container has been filled, it is closed by squeezing or folding the top of the container together. The container is then sealed by folding the integral sealing flap over one side of the top of the closed container. The sealing flap is then secured using conventional adhesives, such as, for example, glue, rubber cement, or tape, that are integral to either or both the surface of the container, or the surface of the sealing flap. In addition, in one embodiment, the adhesive is reusable, so that the container may be opened, refilled, and then resealed. Further, because the volume of the container may be lessened by squeezing or folding the top of the container together, as described above, in one embodiment, a fill-line is included on either the interior or exterior surface of the container for alerting the user to a maximum volume for the sealed container.

As discussed above, unlike conventional containers using removable lids, disposable containers in accordance with the present invention are sealed with adhesive. Consequently, once sealed, such disposable containers invention are much less likely to be inadvertently opened, such as by squeezing, dropping, or knocking over the container, then are conventional containers using removable lids. Consequently, disposable containers according to the present invention can also provide a safety advantage over conventional containers by reducing or eliminating slippery puddles caused by inadvertent spills of beverages, food, or other substances contained within the disposable container. Similarly, because disposable containers according to the present invention can also be manufactured from insulating materials, hot liquids held within such containers are less likely to spill, for the aforementioned reasons, than is an identical liquid when held in a conventional container using a removable lid. Clearly, preventing the spillage of hot liquids results in a safety advantage over conventional disposable containers having removable lids by reducing the likelihood of burns or scalding when spilled hot liquid comes into contact with a victims skin.

Because the container is thin walled, as described above, it is preferably stackable, one container within the next, such as is typically seen with beverage cups in conventional dispensers. In fact, the containers may be sized to fit any type of conventional container dispenser. Consequently, such containers are useful for replacing existing beverage containers in places such as fast food restaurants, and convenience stores, as well as in dispensers for home use. This is especially true because as described above, disposable containers in accordance with the present invention do not use separate lids. Consequently, use of such containers serves to reduce both cost and storage space requirements by eliminating the need to supply lids with the containers.

In one embodiment of the disposable container invention of the present invention, the integral sealing flap extends above a primary side of the opening of the container. Consequently, as the container opening is pushed together, the sealing flap is folded over a secondary side of the opening and fixed in place using adhesive, as described above, to securely seal the disposable container. When using this embodiment of the disposable container as a drinking cup, in a non-closed, non-sealed condition, a user typically drinks from the secondary side of the opening to prevent spillage because the rim of the secondary side is lower than the integral sealing flap extending from the primary side.

In a similar embodiment of the disposable container, the integral sealing flap is initially folded back against the exterior wall of the container below the primary side of the container opening. Assuming a round container opening, the integral sealing flap is locked into place by nature of the container geometry until the top of the container is pushed together, as described above. Once the top of the container is pushed together, the curved rim of the opening becomes straight, thereby allowing the integral sealing rim to be folded up and then over the secondary side of the opening, as described above. Finally, as described above, the sealing flap is then fixed in place using adhesive to securely seal the disposable container. Further, when using this embodiment of the disposable container as a drinking cup, in a non-closed, non-sealed condition, a user may drink from any side or portion of the container opening, because the entire rim of the container opening is at the same level.

In another embodiment of the disposable container, the upper portion of the exterior wall is perforated in at least two locations. Tearing the perforations results in a sealing flap on the primary side of the container opening, and an extra flap on the secondary side of the container opening. In operation, the extra flap is folded down into the interior of the opening of the container. Alternately, the extra flap is removed by tearing a perforation at the base of the extra flap. Either way, the container is then essentially in the same configuration as described above for the embodiment wherein the integral sealing flap extends above the primary side of the container. Thus, as described above, the container is closed by pushing together the primary and secondary sides of the container opening. The container is then sealed by folding the sealing flap over the secondary side of the opening and fixed in place using adhesive, as described above, to securely seal the disposable container. Further, when using this embodiment of the disposable container as a drinking cup, in a non-closed, non-sealed condition, prior to tearing the perforations, a user may drink from any side or portion of the container opening, because the entire rim of the container opening is at the same level.

Further, in an embodiment related to the embodiment wherein the extra flap is removed by tearing the perforation at the base of the flap, the extra flap contains printed information such as textual or graphical information, or both. Consequently, the extra flap containing printed information can be used as a removable game piece, coupon, advertising, etc., simply by tearing the perforation to remove the extra flap from the container.

Each embodiment of the disposable container may also include a frangible area in the exterior wall of the container near the opening. This frangible cover allows a straw or drinking tube to be placed through the exterior wall of the container once the container has been sealed as described above.

In a further embodiment, the disposable container includes an integral straw or drinking tube that protrudes through the exterior wall of the container. This integral straw preferably includes a flexible joint or elbow at the location where it protrudes through the exterior wall of the container. The integral straw can be used whether the disposable container has been sealed or not.

In a related embodiment, the disposable container includes an integral extensible straw or drinking tube. This straw is disposed within a guide tube affixed to the interior wall of container. The straw is manually extended by pulling on an upper end of the straw, which protrudes through an opening in the exterior wall of the container near the container opening. A snug fit between the guide tube and the straw ensures that the guide tube acts as an extension to the straw when the straw is extended. Consequently, when a user drinks from the extended straw, suction is maintained both in the straw and in the guide tube. In one embodiment, a recess in the exterior wall of the container near the opening allows user access to the upper end of the straw. One advantage of including the recess in the exterior wall of the container to provide access to the extensible straw is that the outer surface of the container does not have any protuberances when the straw is not extended. As a result, such containers are easily stackable, one container within the next, as described above. Further, in another embodiment, access to the upper end of the straw is covered with a frangible membrane. Consequently, the straw is not accessible until a user removes the membrane.

Further, in one embodiment, the disposable container is designed with a pouring spout. This pouring spout is accessible to a user whether or not the disposable container has been sealed. Further, the pouring spout is preferably recessed within the disposable container such that it does not protrude from the exterior wall of the container until it has been extended by a user. Further, in another embodiment, access to the pouring spout is covered with a frangible membrane. Consequently, the pouring spout is not accessible until a user removes the membrane.

In still another embodiment of the disposable container, a recess is disposed within the surface of the exterior wall of the container, or within the exterior of a bottom wall of the container. In either embodiment, this recess is used to contain a package for holding a single serving or portion of powdered or liquid drink mix, sweeteners, or any other desired compound. Such an embodiment is extremely useful in households having small children, especially when combined with one of the embodiments described above that include an integral straw. For example, where the contents of the package are a powdered drink mix, the user first removes the package from the recess. The user then opens the package and pours the contents into the container. Finally, the user adds water, or whatever other fluid is to be mixed with the contents of the package, and seals the container as described above. The result is an instant drink in a spill-proof container, having an integral straw. Such a combination is clearly ideal for small children. In another embodiment, access to the package is covered with a frangible membrane. Consequently, the package is not accessible until a user removes the membrane.

In a related embodiment, the package for holding a single serving or portion of powdered or liquid drink mix, sweeteners, or any other desired compound, as described above, may be one of the frangible membranes discussed above. Specifically, in the embodiment wherein the frangible membrane is used to cover access to the integral straw, the membrane also serves as the package, with one side of the package covering access to the integral straw. In this embodiment, removing the package to access the contents of the package also serves to provide access to the upper end of the integral straw as described above. Similarly, in the embodiment wherein the frangible membrane covers access to the integral pouring spout, the membrane again serves as the package, with one side of the package covering access to the integral pouring spout. In this embodiment, removing the package to access the contents of the package also serves to provide access to the integral pouring spout as described above.

Finally, in another embodiment, the disposable container includes a conventional scratch-off, rub-off, or peel-off label on the exterior surface of the container. Such removable labels are typically used for advertising or entertainment purposes.

The foregoing and still further features and advantages of the present invention as well as a more complete understanding thereof will be made apparent from a study of the following detailed description of the invention in connection with the accompanying drawings and appended claims.

DESCRIPTION OF THE DRAWINGS

The specific features, aspects, and advantages of the present invention will become better understood with regard to the following description, appended claims, and accompanying drawings in which like reference numbers represent corresponding parts throughout.

FIG. 1 is an exemplary perspective view of a disposable container according to the present invention.

FIG. 2 is a side view of the disposable container of FIG. 1.

FIG. 3 is an exemplary side view of an alternate embodiment of a disposable container according to the present invention.

DETAILED DESCRIPTION OF THE PREFERRED EMBODIMENTS

Figure 4:
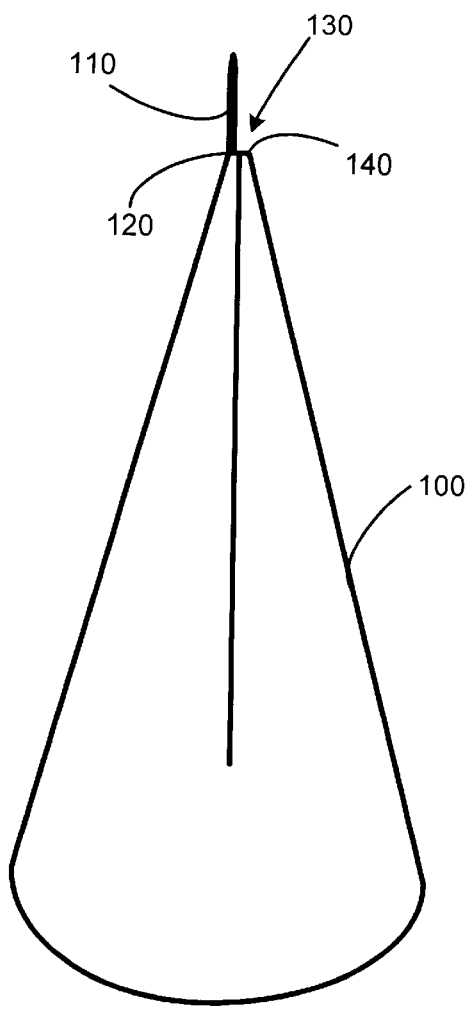
FIG. 4 is a perspective side view of the disposable container of FIG. 1, shown in a closed state.

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Introduction

A disposable container according to present invention is embodied in a thin-walled container having an integral adhesive sealing flap. Such containers include cups or other vessels for holding beverages, food or other substances. The disposable container preferably has a truncated conical shape. One example of such a shape is a typical beverage cup commonly dispensed at fast food restaurants and convenience stores. However, any shape or size of disposable container may be used, so long as the container is sealed in accordance with the present invention. However, regardless of the shape or style of the container, once the container has been filled, it is closed by pushing, squeezing or folding the top of the container together. The container is then sealed by folding the integral sealing flap over one side of the top of the closed container. The sealing flap is then secured using integral conventional adhesives, such as, for example, glue, rubber cement, tape, or some combination thereof. These adhesives are integral to either or both the surface of the container, and the surface of the sealing flap.

Components

As illustrated in FIG. 1 and FIG. 2, the disposable container 100 includes an integral sealing flap 110 extending above a primary side 120 of a container opening 130. In operation, as described in further detail below, the integral sealing flap 110 is folded over a secondary side 140 of the container opening 130 to close the container 100. Further, the integral sealing flap 110 is preferably. coated with a conventional adhesive 160, such as glue, rubber cement, tape, or some combination thereof, for fixedly attaching the integral sealing flap the exterior of the secondary side 140 of the container opening 130 in order to securely seal the container 100.

The adhesive 160 is prepared for use in any one of several ways. First, the adhesive may be covered with a conventional removable strip. In this embodiment, the strip is simply removed prior to adhering the integral sealing flap 110 to the secondary side 140 of the canister opening 130. Further, in this embodiment, the container 100 can be designed with the adhesive 160 on either or both the sealing flap 110 and the secondary side 140 of the container opening 130. Alternately, where a contact type adhesive is used, such as rubber cement, the adhesive 160 is pre-positioned on both the integral sealing flap 110 and the secondary side 140 of the canister opening 130. Consequently, in this embodiment, as soon as the integral sealing flap 110 comes into contact with the secondary side 140 of the canister opening 130, the sealing flap will be bonded to the secondary side of the container opening, thereby sealing the container. In still another embodiment, a piece of tape is integrated into either or both the sealing flap 110 and the secondary side 140 of the container opening 130. In such an embodiment, the integral sealing flap 110 is secured in place over the secondary side 140 of the container opening 130 to seal the container 100. In addition, in one embodiment, the adhesive 160 is reusable, using conventional techniques, so that the container 100 may be opened, refilled, and then resealed.

Further, in one embodiment, a frangible membrane, perforation, or cutout 150 in the surface of the container 100 allows a straw or drinking tube to be placed through the wall of the container and into a fluid or beverage contained therein. This feature may also be included in each of the alternate embodiments discussed below.

Additionally, because the volume of the container may be lessened by squeezing or folding the top of the container together, as described above, in one embodiment, as illustrated in FIG. 2 a fill-line 200 is included on either the interior or exterior surface of the container 100 for alerting the user to a maximum volume for the sealed container.

In a further embodiment, as illustrated in FIG. 3, the integral sealing flap 110 is initially folded down over the exterior of the primary side 120 of the container opening 130. In this embodiment both the primary side 120 and the secondary side 140 of the container opening 130 are at the same level, making it easier for a user to drink from the container 100 when used in an un-closed, un-sealed state.

Operation

Figure 5:
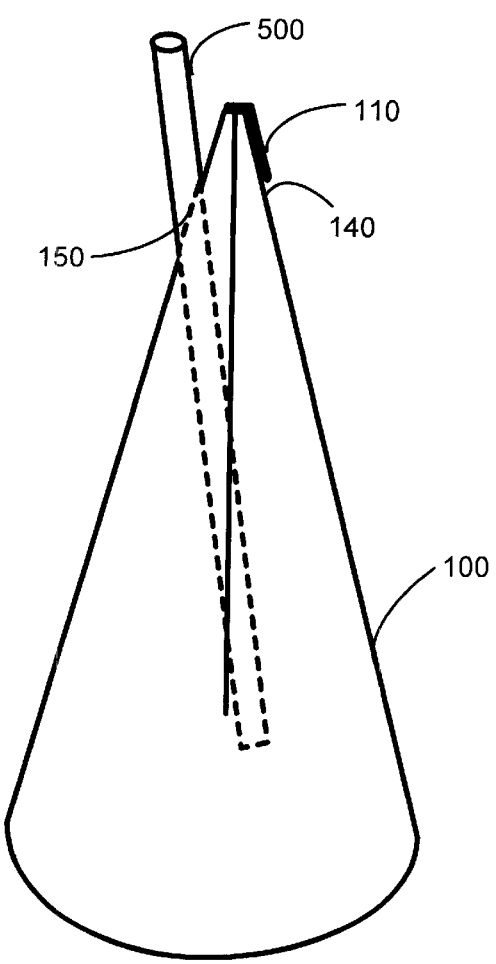
FIG. 5 is a perspective side view of the disposable container of FIG. 1, shown in a sealed state.

The following discussion provides an exemplary description of a preferred mode of operation. This discussion is intended for illustrative purposes only, and is not intended to limit the scope of the invention. The following discussion describes methods for closing and sealing the disposable container 100 in accordance with the present invention with reference to FIGS. 1, 4 and 5. FIG. 4 and FIG. 5 are exemplary side views of the disposable container 100 shown in FIG. 1. Specifically, FIG. 4 shows a perspective view of the disposable container 100 in a closed state, while FIG. 5 shows of perspective view of the disposable container 100 in a sealed state.

In a preferred embodiment of the disposable container 100, the integral sealing flap 110 extends above the primary side 120 of the container opening 130. In this embodiment the container is closed by simply pushing or squeezing. together the primary and secondary sides, 120 and 140, of the container opening 130. Next, once the primary and secondary sides 120 and 140, of the container opening 130 are in contact, (FIG. 4) the integral sealing flap 110 is folded over the secondary side 140 of the opening and fixed in place using the integral adhesive 160, as described above, to securely seal the disposable container 100 (FIG. 5). Further, when using this embodiment of the disposable container 100 as a drinking cup, in a non-closed, non-sealed condition, a user typically drinks from the secondary side 140 of the container opening 130 to prevent spillage because the rim of the secondary side is lower than the integral sealing flap 110 extending from the primary side 120.

In a similar embodiment of the disposable container, the integral sealing flap 110 is initially folded back against the exterior wall of the container below the primary side 120 of the container opening 130. Assuming a round container opening, the integral sealing flap 110 is locked into place by nature of the container 100 geometry until the top of the container is pushed together, as described above, in order to close the container. Once the top of the container 100 is closed, the curved rim of the opening 130 becomes straight, thereby allowing the integral sealing rim 110 to be folded up and then over the secondary side 140 of the opening, as described above. Finally, as described above, the sealing flap 110 is then fixed in place using adhesive 160 to securely seal the disposable container 100. Further, when using this embodiment of the disposable container 100 as a drinking cup, in a non-closed, non-sealed condition, a user may drink from any side or portion of the container opening 130, because the entire rim of the container opening is at the same level.

In addition, as discussed above, the container 100 may also include the frangible membrane, perforation, or cutout 150 in the surface of the container 100 for allowing a straw or drinking tube to be placed through the wall of the container and into a fluid or beverage contained therein. For example, as illustrated in FIG. 5, straw 500 extends through the wall of the container 100 via the perforation 150. In operation, the straw 500 is simply pushed through the membrane, perforation, or cutout 150 when a user desires to use the straw.

Additional Embodiments

Figure 6:
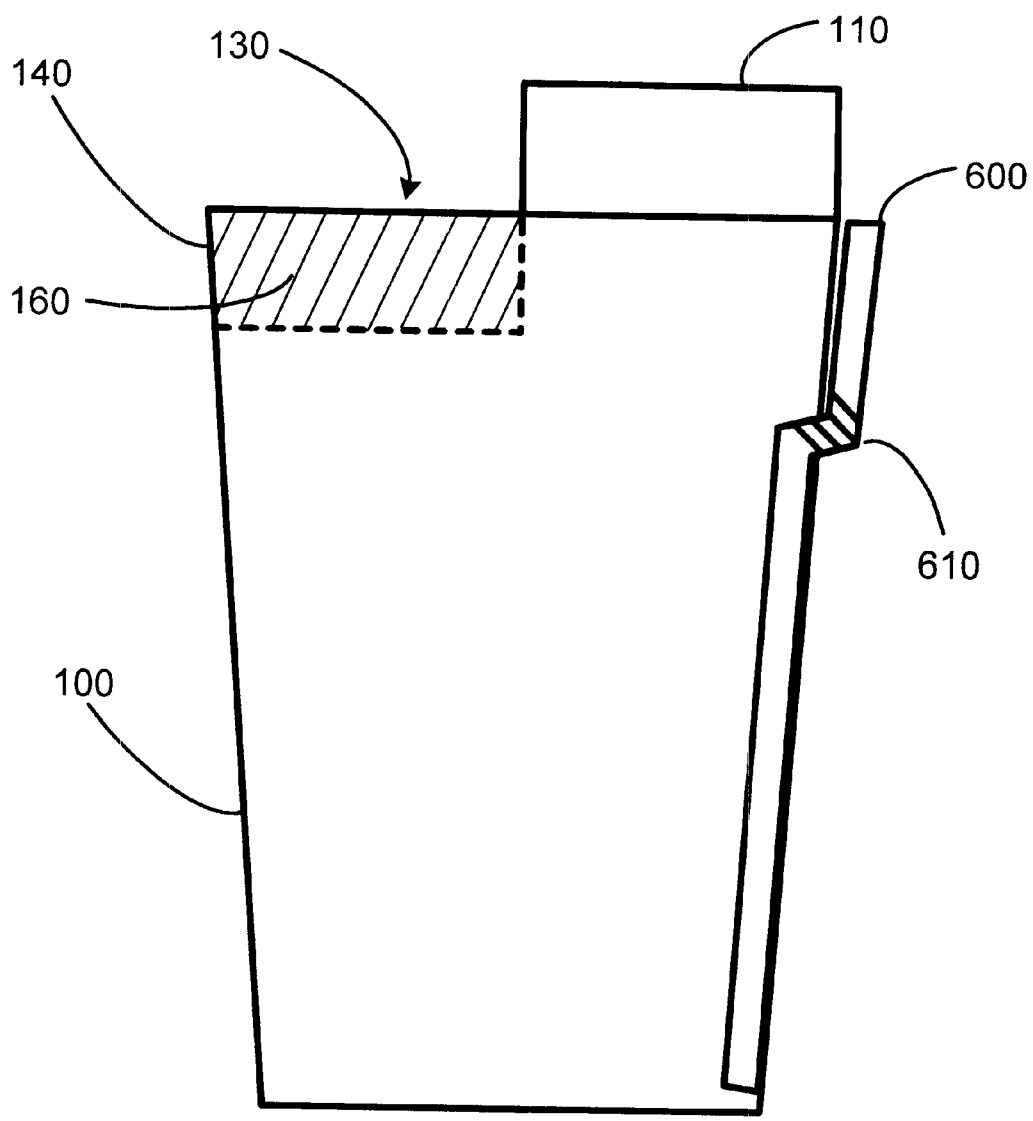
FIG. 6 is an exemplary side view of an alternate embodiment of a disposable container according to the present invention shown with an integral drinking straw.

In a further embodiment, as illustrated by FIG. 6, the disposable container 100 includes an integral straw or drinking tube 600 that protrudes through the exterior wall of the container. This integral straw 600 preferably includes a flexible joint or elbow 610 at the location where it protrudes through the exterior wall of the container 100. The flexible joint 610 allows the straw 600 to be adjusted to suit the preferences of the user. The integral straw 600 is securely affixed to the container 100, and can be used whether the disposable container has been sealed or not.

FIG. 6 also illustrates an embodiment wherein the adhesive 160 is integral to the secondary side 140 of the container opening 130. In this embodiment, the integral sealing flap 110 operates as described above in adhering to the secondary side 140 of the container opening 130. The only difference is the location of the adhesive 160, which operates in the manner described above.

Figure 7:
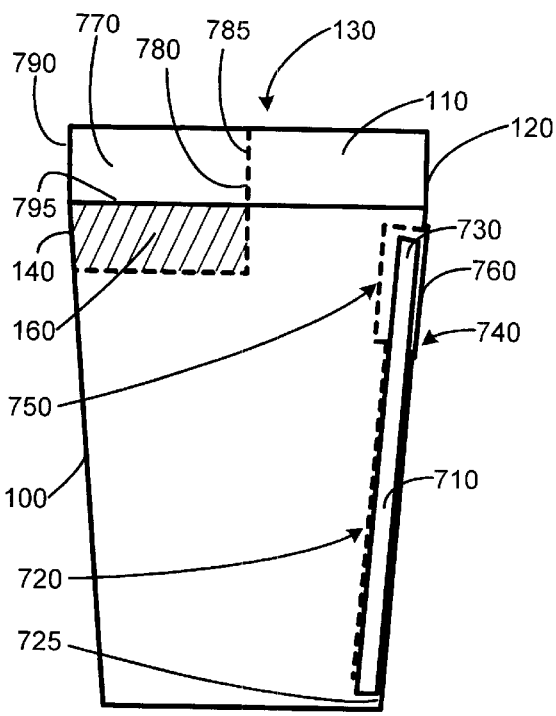
FIG. 7 is an exemplary side view of an alternate embodiment of a disposable container according to the present invention shown with an integral extensible drinking straw.
Figure 8A:
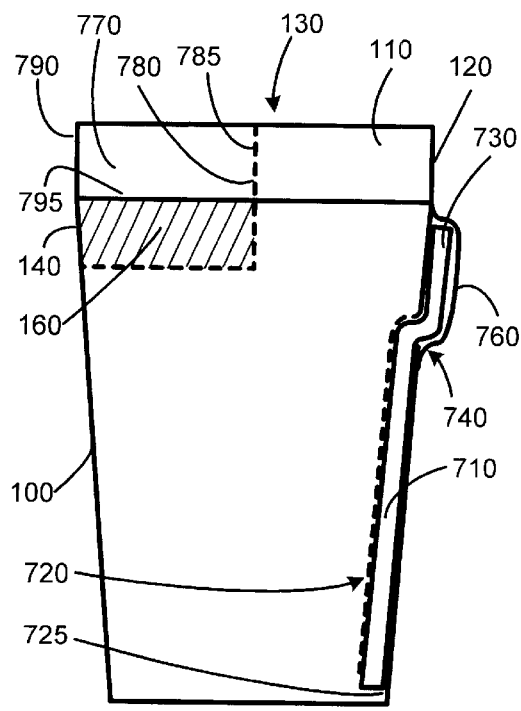
FIG. 8A is an exemplary side view of an alternate embodiment of a disposable container according to the present invention shown with an integral extensible drinking straw.

In related embodiments illustrated in FIG. 7, and FIG. 8A, the disposable container 100 includes an integral extensible straw or drinking tube 710. This extensible straw 710 is disposed within a guide tube 720 affixed to the interior wall 725 of the container 100. The extensible straw 710 is manually extended by pulling on an upper end 730 of the straw, which protrudes through an opening 740 in the exterior wall of the container near the container opening 130. A snug fit between the guide tube 720 and the extensible straw 710 ensures that the guide tube acts as an extension to the straw when the straw is extended. Consequently, when a user drinks from the extended straw 710, suction is maintained both in the extensible straw and in the guide tube 720. Further, in another embodiment, access to the upper end of the straw is covered with a frangible membrane 760. Consequently, the extensible straw 710 is not accessible until a user removes or tears the frangible membrane 760.

In one embodiment (FIG. 7), a recess 750 in the exterior wall of the container 100 near the opening 130 allows user access to the upper end 730 of the extensible straw 710. One advantage of including the recess 750 in the exterior wall of the container 100 to provide access to the extensible straw 710 is that the outer surface of the container does not have any protuberances when the straw is not extended. As a result, such containers 100 are easily stackable, one container within the next, as described above.

Figure 8B:
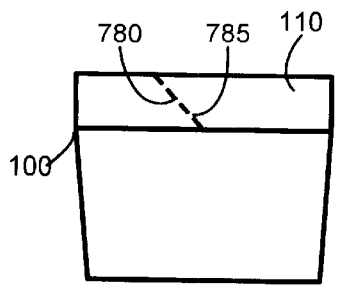
FIG. 8B is an exemplary side view of an alternate embodiment of a disposable container according to the present invention shown with angled perforations for a sealing flap.
Figure 8C:
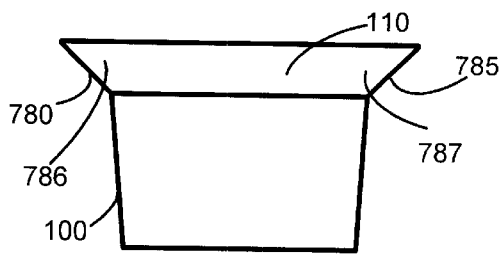
FIG. 8C is an exemplary front view of the disposable container of FIG. 8B shown with the seal tabs extending from either edge of the sealing flap.

In another embodiment of the disposable container 100 as illustrated by both FIG. 7 and FIG. 8A, an upper portion 770 of the exterior wall of the container 100 is perforated 780 and 785 in at least two locations equidistant around the rim of the container 100. Note that as a side view is shown by FIG. 7, FIG. 8A, and FIG. 8B, only the perforation 780 in the foreground can be seen in the figures, with perforation 785 being behind perforation 780, as illustrated. Tearing the perforations 780 and 785 results in a sealing flap 110 on the primary side 120 of the container opening 130, and an extra flap 790 on the secondary side 140 of the container opening 130. In a related embodiment, the perforations, 780 and 785 are placed at an angle to the vertical as illustrated in FIG. 8B. In a tested embodiment, a 45 degrees angle was used. Placing the perforations at an angle serves to create seal tabs 786 and 787 on either edge of the sealing flap 110. These seal tabs, 786 and 787 are useful for wrapping around the sides of the top of the container 100 when the sealing flap 110 is folded over the top of the container 100 to more securely seal the container. The seal tabs, 786 and 787, are illustrated in FIG. 8C which shows a front view of the sealing tab 110 after tearing the perforations 780 and 785.

Further, when using any of these embodiments of the disposable container 100 as a drinking cup, in a non-closed, non-sealed condition, prior to tearing the perforations 780 and 785, a user may drink from any side or portion of the container opening 130, because the entire rim of the container opening is at the same level.

Figure 9:
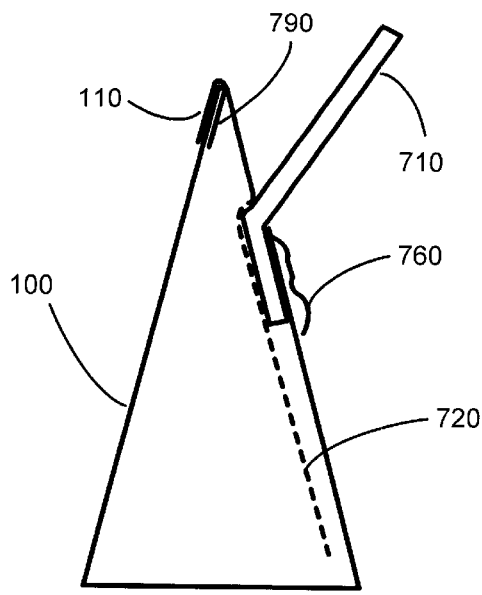
FIG. 9 is a side view of the disposable container of FIG. 7, shown in a sealed state with the extensible drinking straw in an extended position.

In operation, as illustrated by FIGS. 7, 8 and 9, the extra flap 790 is folded down into the interior of the opening 130 of the container 100. Alternately, the extra flap 790 is removed by tearing a perforation 795 at the base of the extra flap. Either way, the container 100 is then essentially in the same configuration as described above for the embodiment wherein the integral sealing flap 110 extends above the primary side 120 of the container 100. Thus, as described above, the container 100 is closed by simply pushing or squeezing together the primary and secondary sides, 120 and 140, of the container opening 130. Next, once the primary and secondary sides 120 and 140, of the container opening 130 are in contact, the integral sealing flap 110 is folded over the secondary side 140 of the opening and fixed in place using the integral adhesive 160, as described above, to securely seal the disposable container 100.

Further, in an embodiment related to the embodiment wherein the extra flap 790 is removed by tearing the perforation 795 at the base of the extra flap, the extra flap contains printed information such as textual or graphical information, or both. Consequently, the extra flap 790 containing printed information can be used as a removable game piece, coupon, advertising, etc., simply by tearing the perforation 795 to remove the extra flap from the container 100.

Figure 10:
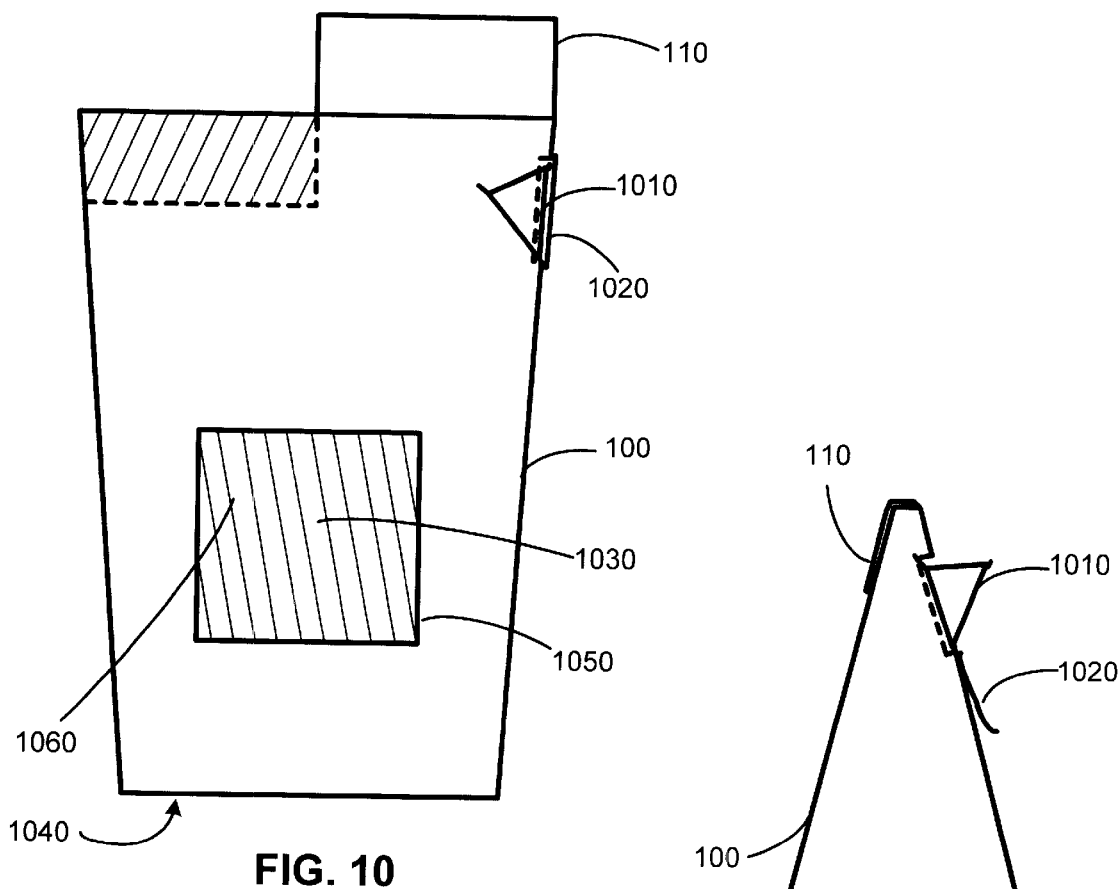
FIG. 10 is an exemplary side view of an alternate embodiment of a disposable container according to the present invention shown with an integral pouring spout.
Figure 11:
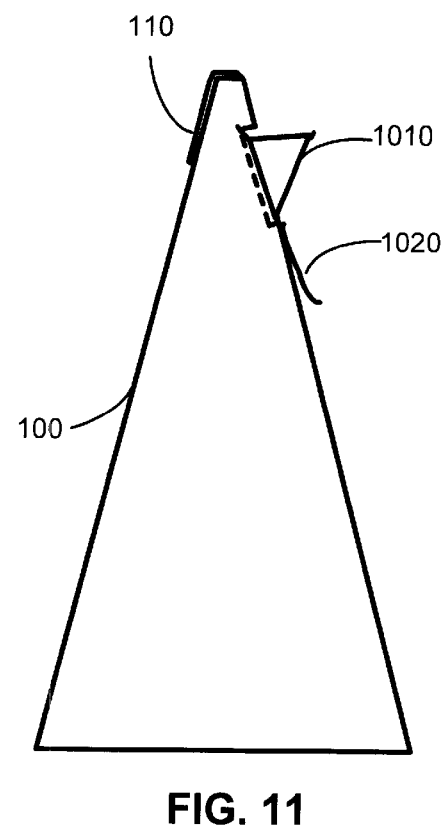
FIG. 11 is a side view of the disposable container of FIG. 11, shown in a sealed state with the pouring spout extended.

In a further embodiment, as illustrated by FIG. 10, the disposable container 100 is designed with a pouring spout 1010. This pouring spout 1010 is accessible to a user whether or not the disposable container 100 has been sealed. Further, the pouring spout 1010 is preferably recessed within the disposable container 100 such that it does not protrude from the exterior wall of the container until it has been extended by a user as illustrated by FIG. 11. Further, in another embodiment, access to the pouring spout 1010 is covered with a frangible membrane 1020. Consequently, the pouring spout is not accessible until a user removes or tears the membrane 1020. Each of these embodiments is closed and sealed as described above using any of the aforementioned embodiments of the integral sealing flap 110.

Figure 12:
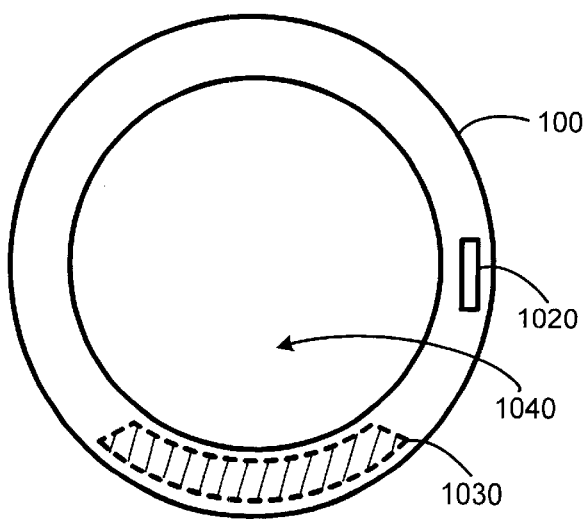
FIG. 12 is a top view of the disposable container of FIG. 10.

In still another embodiment of the disposable container 100, as illustrated by FIG. 10 and FIG. 12, a recess 1030 is disposed within the surface of the exterior wall of the container, or within the exterior of a bottom wall 1040 of the container. In either embodiment, this recess 1030 is used to contain a package 1050 for holding a single serving or portion of powdered or liquid drink mix, sweeteners, or any other desired compound. Such an embodiment is extremely useful in households having small children, especially when combined with one of the aforementioned embodiments including an integral straw. For example, where the contents of the package 1050 are a powdered drink mix, the user first removes the package from the recess 1030. The user then opens the package 1050 and pours the contents into the container 100. Finally, the user adds water, or whatever other fluid is to be mixed with the contents of the package 1050, and seals the container 100 as described above. The result.is an instant drink in a spill-proof container, having an integral straw. Such a combination is clearly ideal for small children. In another embodiment, access to the package is covered with a frangible membrane 1060. Consequently, the package 1050 is not accessible until a user removes or tears the membrane 1060.

In a related embodiment, the package 1050 may be one of the frangible membranes discussed above (i.e., frangible membrane 760 of FIG. 7 and FIG. 8A, and frangible membrane 1020 of FIG. 10). Specifically, with reference to FIG. 7 and FIG. 8A, in the embodiment wherein the frangible membrane 760 is used to cover access to the integral straw 710, the membrane also serves as the package, with one side of the package covering access to the integral straw. In this embodiment, removing the membrane 760 to access the contents of the package also serves to provide access to the upper end of the integral straw 710 as described above. Similarly, with reference to FIG. 10, in the embodiment wherein the frangible membrane 1020 covers access to the integral pouring spout 1010, the membrane again serves as the package, with one side of the package covering access to the integral pouring spout. In this embodiment, removing the membrane 1020 to access the contents of the package also serves to provide access to the integral pouring spout 1010 as described above.

Figure 13:
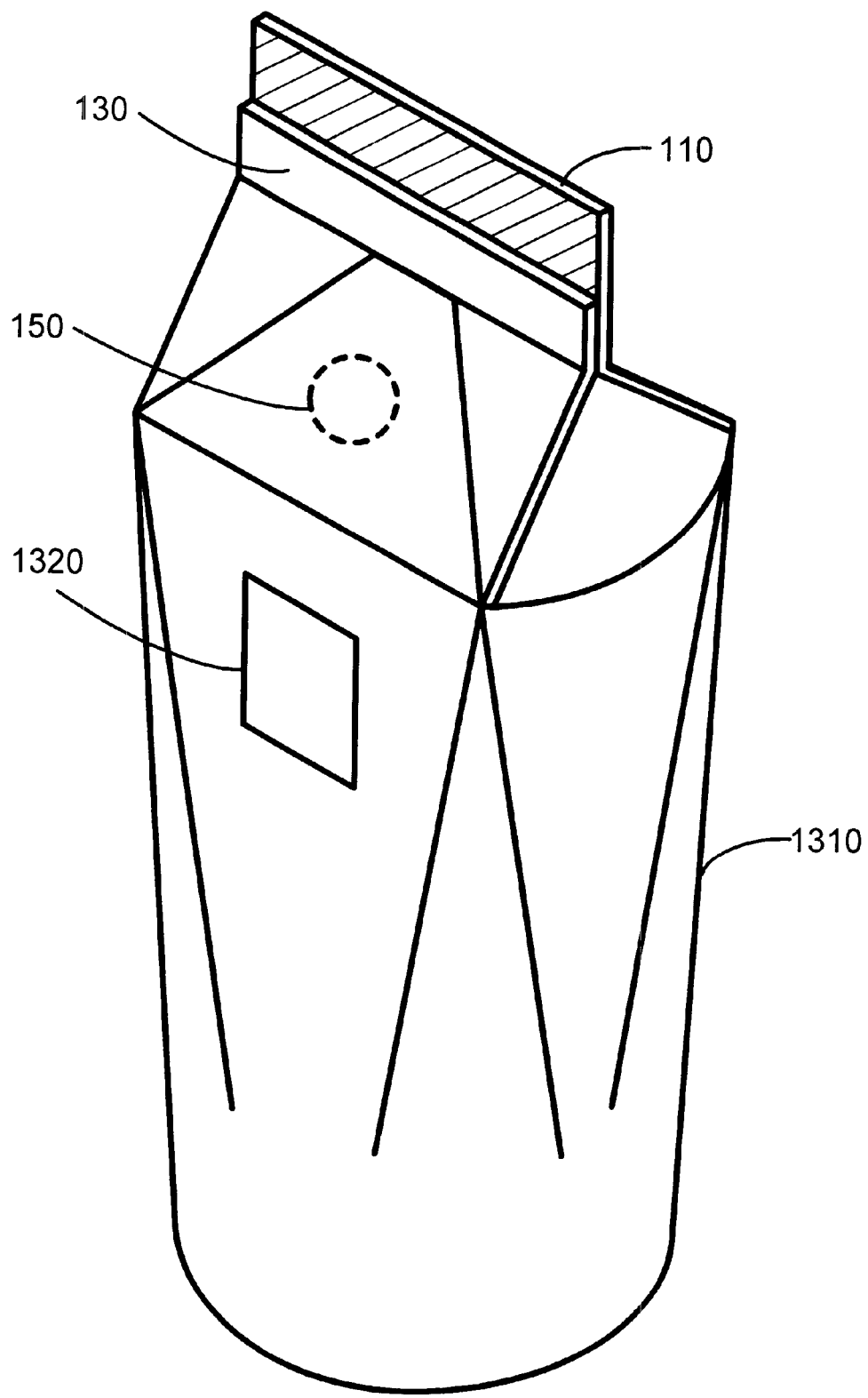
FIG. 13 is an exemplary perspective view of a disposable container shown in a closed unsealed state.

In an additional embodiment of the disposable container, as illustrated in FIG. 13 a container 1310 having a folding gable top with an integral sealing flap 110 is used. FIG. 13 illustrates this container in a closed, non-sealed condition. In operation, this container 1310 is folded together in order to close the container in a manner similar to that of a conventional paper milk carton. This container 1310 is sealed as described above, by folding the integral sealing flap 110 over the secondary side 140 of the container opening, and fixedly attaching the integral sealing flap to the exterior of the secondary side of the container opening in order to securely seal the container 1310.

FIG. 13 further illustrates the inclusion of the frangible membrane, perforation, or cutout 150 in the surface of the container 1310 to allow a straw or drinking tube to be placed through the wall of the container as described above.

Finally, in another embodiment, also as illustrated in FIG. 13, the disposable container 1310 includes a conventional scratch-off, rub-off, or peel-off label 1320 on the exterior surface of the container. Such removable labels are typically used for advertising or entertainment purposes. Clearly, such a label 1320 can be included with any of the aforementioned embodiments.

The foregoing description of the invention has been presented for the purposes of illustration and description. It is not intended to be exhaustive or to limit the invention to the precise form disclosed. Many modifications and variations are possible in light of the above teaching. For example, one or more of the aforementioned embodiments may be combined to produce a plurality of hybrid embodiments of a disposable container in accordance with the present invention. Thus, it is intended that the scope of the invention be limited not by this detailed description, but rather by the claims appended hereto.

What is claimed is:

1. A spill-proof disposable container comprising:
   an integral sealing flap extending from a primary side of the top of the container;
   wherein the sealing flap is foldable for simultaneously covering an opening of the disposable container and a secondary side of the disposable container;
   an integral straw coupled to an interior wall of the disposable container, wherein an upper end of the straw extends through a cutout in a sidewall of the container; and
   an adhesive strip bonded to a first surface of the sealing flap for fixedly adhering the sealing flap to the secondary side of the disposable container for sealing the disposable container in a spill-proof state.

2. The disposable container of claim 1 wherein the straw is disposed within a guide tube that is coupled to the interior wall of the container.

3. The disposable container of claim 2 wherein the straw is extensible by pulling on the upper end of the straw.

4. The disposable container of claim 1 wherein the cutout and the upper end of the straw are covered by a frangible membrane.

5. The disposable container of claim 1 further comprising a fill line disposed on the surface of the container for indicating a maximum level for filling the container.

6. The disposable container of claim 1 further comprising a frangible membrane disposed within a sidewall of the disposable container for inserting a straw through the frangible membrane and into the container.

7. The disposable container of claim 1 further comprising an integral pouring spout coupled to the interior of a sidewall of the container.

8. The disposable container of claim 7 further comprising a frangible membrane for covering the pouring spout.

9. The disposable container of claim 1 further comprising a recess in the exterior of a sidewall of the container for holding a package containing a substance for mixing in the container.

10. The disposable container of claim 1 further comprising a scratch-off label.

11. A container assembly comprising:
    a container having a primary side, a secondary side, and an opening disposed about the top of the container;
    a sealing flap coupled to the primary side of the top of the container, wherein the sealing flap is releasably coupled along two edges to an extra flap by means of a perforation along each edge, said sealing flap being foldable for simultaneously covering the opening of the container and the secondary side of the container; and
    a first adhesive bonded to an exterior surface of the secondary side of the container for fixedly adhering the sealing flap to the secondary side of the disposable container for sealing said container.

12. The container assembly of claim 11 further comprising an integral straw coupled to the interior of a sidewall of the container and extending through a straw opening in the sidewall of the container.

13. The container assembly of claim 12 wherein the integral straw is comprised of a straw disposed within a guide tube, and wherein the guide tube is coupled to the interior of the sidewall of the container.

14. The container assembly of claim 13 wherein the integral straw is extensible, and wherein the straw is extended by pulling on a top portion of the straw.

15. The container assembly of claim 12 wherein the integral straw further includes a flexible joint at a point along the length of the straw where the straw extends through the straw opening in the sidewall of the container.

16. The container assembly of claim 11 further comprising a second adhesive bonded to a first surface of the sealing flap for fixedly adhering the sealing flap to the adhesive bonded to the secondary side of the disposable container.

17. The container assembly of claim 11 further comprising a frangible membrane disposed within a sidewall of the disposable container for inserting a straw through the frangible membrane and into the container assembly.

18. The container assembly of claim 11 wherein the container assembly is stackable within a like container assembly for the purpose of nesting a plurality of the container assemblies, one within the next.

19. The container assembly of claim 18 wherein at least one stackable container assembly is disposed within a container dispensing mechanism for dispensing at least one container assembly.

* * * * *